Jan. 22, 1924.

M. ANNINGER

ELECTRICITY METER

Filed April 30, 1919

1,481,335

Inventor
Mario Anninger
By R. Singer
Attorney

Patented Jan. 22, 1924.

1,481,335

UNITED STATES PATENT OFFICE.

MARIO ANNINGER, OF TRIESTE, ITALY.

ELECTRICITY METER.

Application filed April 30, 1919. Serial No. 293,815.

*To all whom it may concern:*

Be it known that I, MARIO ANNINGER, subject of the King of Italy, residing at Trieste, Italy, have invented certain new and useful Improvements in Electricity Meters, of which the following is a specification.

This invention relates to a device which is applicable to electricity meters, and its purpose is to enable electric energy to be supplied in variable quantities, according to the demand of the consumer. The apparatus is designed so that it automatically shuts off the supply as soon as a predetermined quantity has been consumed. The apparatus is set by a person on the staff of the electric supply station.

Figure 1:
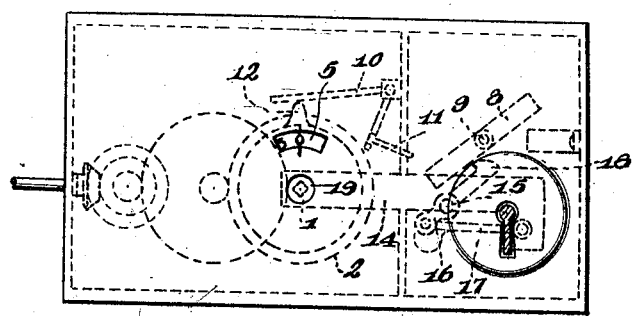
Figure 2:
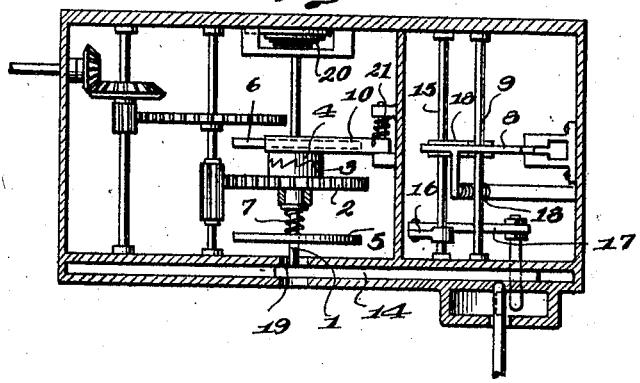
Figure 3:
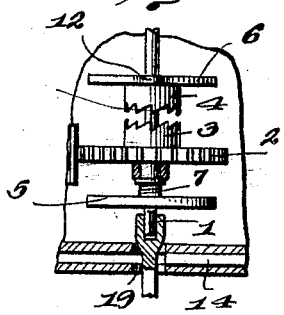
Figure 4:
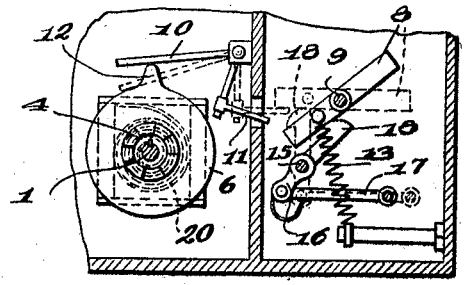

In the accompanying drawing:

Figures 1 and 2 show the complete apparatus, in elevation and plan respectively, and Figures 3 and 4 are detail views.

The device is constituted by a spindle 1 driven by a toothed wheel 2 secured to a clutch hub 3 and mounted on the spindle in a longitudinally adjustable manner. To the same spindle are keyed, a toothed clutch member 4 opposite the toothed clutch hub 3, a dial 5 and a disc 6 which is provided at one point in its circumference with a projection 12. A compression spring 7 is used to keep in engagement the clutch members 3 and 4 whereby any movement imparted to the wheel 2 by the meter is transmitted to the whole of the device. A spring 20 acts on the spindle to return the disk 6 to zero position.

In order to set the apparatus, the spindle 1, and with it the dial 5 and the disc 6, are turned by a suitable spanner or key, the cylinder 4 being moved relatively to the cylinder 3 to the extent of the number of teeth required in order that the number of the desired kilowatts should appear to the window of the casing of the apparatus.

During the said operation the wheel 2 does not move owing to the longitudinal movement which, together with the hub 3, the said wheel can execute on the spindle 1, so that it remains in the position it has been brought by the rotation of the meter. This makes it possible to reset the apparatus prior to the complete consumption of the amount previously determined, and thus to obtain an uninterrupted supply.

A switch mechanism is constituted by a knife blade 8 mounted on a pin 9 and supported, in the closed circuit position by the short arm 11 of a bell crank lever 10, the longer arm of which is always in contact with the periphery of the disc 6.

The movement of rotation which the meter transmits through the wheel 2 and the clutch 3, 4 to the spindle 1 and to the disc 6, is in the opposite direction to the movement which these parts execute during the setting of the apparatus. When the predetermined amount of energy has been consumed, the disk 6 is turned back by the spring 20 to zero position, and the projection 12 actuates the bell crank lever 10, and moves the shorter arm of said lever out of engagement with the blade 8 and hence releases the latter, whereupon the spring 13 moves the blade to circuit breaking position. The detent 11 does not lock the switch arm 8 but only supports it until the dial has reached the zero position as shown in Figs. 1 and 2. Fig. 4 shows in dotted lines the position of the detent 11 when the apparatus is still working and it is held in this position by a spring 21.

The hole 19 through which the spanner or key is introduced for setting the apparatus, is normally closed by a bolt 14, this being done to prevent unauthorized persons from setting the apparatus.

When the meter is disconnected, and the dial of the distributor points to zero, the knife blade 8 is in an oblique position parallel to that of a tappet lever 18 which supports it. In order to make the apparatus operative again, the knife 8 must be brought back to the operative position. This is done by moving the bolt 14 which acts, through a rod 17, on a crank handle 16. The latter turns the spindle 15 to which is secured the tappet lever 18, which, having been brought into the vertical position, returns the knife blade 8 to its operative or closed circuit position.

In order to avoid any omission to properly set the apparatus after the insertion of the knife blade in practice, the lock is so constructed that it is impossible to withdraw the spanner or key until the bolt 14 has been brought into the closed position. To effect this I may employ in addition to the spanner shown in Fig. 3, a key operating the bolt 14 belonging to a common lock. This key can always be inserted in its hole only it cannot be retired from the lock so long as the bolt 14 is in the extreme position to the right a pin being provided to prevent the key from being turned round fully 360°. In fact, if either through carelessness or by intention, the dial 5 and the disc 6 have not been returned to the zero position, the arm 11 will remain displaced, and will not therefore offer any support to the knife blade 8 which would be simply supported by the tappet lever 18. But at the same time as the bolt 14 is brought into the closed position, the tappet lever 18 is returned to its oblique position, so that the knife blade 8, having lost all support, is again removed from the closed circuit position, and the circuit is broken.

What I claim is:

Apparatus for use in connection with an electric meter for controlling the supply of limited quantities of electric energy and comprising a spindle arranged for rotation in one direction by a key or the like manually operable instrument and provided with a disk having a tappet element, a spring to normally turn said disk to zero position, meter-actuated driving means for the spindle including a clutch to release the spindle, a bolt movable across the key end of the spindle, a circuit closer including a movable element, a spring to normally hold said element in circuit breaking position, means, operated by the said bolt, to turn said element to circuit closing position, and a detent element to hold said circuit closer element in closed position and including an arm arranged for operation by the tappet to cause said detent element to release the circuit closing element when the said disk is in zero position.

In testimony whereof I have affixed my signature in presence of two witnesses.

MARIO ANNINGER.

Witnesses:
  MATILDE NALESSE,
  PROF. LEO MARLINUZZI.